United States Patent [19]

Craggs

[11] 3,814,441

[45] June 4, 1974

[54] RECORDING ARM SAFETY LIFTER

[75] Inventor: Lester R. Craggs, Nevada City, Calif.

[73] Assignee: Arvin Industries, Inc., Columbus, Ind.

[22] Filed: Sept. 21, 1972

[21] Appl. No.: 290,955

[52] U.S. Cl. ................ 274/23 R, 274/4 H, 274/1 R

[51] Int. Cl. .......................... G11b 3/10, G11b 5/00

[58] Field of Search ..... 178/6.6 DD; 274/4 H, 11 E, 274/23; 340/174.1 C

[56] References Cited

UNITED STATES PATENTS

| | | | |
|---|---|---|---|
| 1,185,559 | 5/1916 | Vaughan | 274/1 R |
| 2,954,234 | 9/1960 | Marks | 274/23 |
| 3,675,932 | 7/1972 | Rabinow | 274/23 A |

*Primary Examiner*—Harry N. Haroian
*Assistant Examiner*—John W. Shepperd
*Attorney, Agent, or Firm*—Biebel, French & Bugg

[57] ABSTRACT

There is disclosed a disc type magnetic recording and playing system wherein a recording arm tracks over concentric circular tracks in a flexible magnetic disc. There is also disclosed apparatus for swinging the recording arm into position with the record/playback transducer centered within a given track, and a stepping motor for stepping the transducer from track to track. A safety lifting device is provided for prevention of excessive wear of any one track. The safety lifting device is under the control of a solenoid which in turn is energized through a timer. When any of several operating controls are activated the timer is set and the solenoid is energized. After a predetermined period of time, the timer deenergizes the solenoid, and the arm is raised automatically. Raising of the arm is accomplished by a spring which works against the solenoid so that there is always a positive arm lifting moment which in the absence of an energizing current to the solenoid, raises the arm. Thus "fail safe" operation is provided.

5 Claims, 5 Drawing Figures

RECORDING ARM SAFETY LIFTER

BACKGROUND OF THE INVENTION

This invention relates to disc type magnetic recording equipment, which is particularly adaptable for use in large bandwidth systems, which is relatively simple in construction and adaptable to various environments. An example of such a system is disclosed in copending U.S. patent application Ser. No. 183,856 filed Sept. 27, 1971, now U.S. Pat. No. 3,731,292 and which is assigned to the assignee of this application. This invention has particular application to such a system configured for repetitive viewing of a recorded video scene or recording of such a scene in the same track. For this purpose such recorders record video information in a series of concentric circular tracks and employ a stepping motor to move the recording or playback head from track to track. It will be appreciated that a recording system of such a type requires special care to avoid excessive wear of any one track. Thus it has been necessary for the operator to be careful to interrupt the operation after a period of time or to move the magnetic transducer to a different track. Any failure on his part to observe this precaution could result in prolonged repetitive playing of the same track for an indefinite period of time thereby unduly wearing that track and possibly damaging the magnetic disc.

SUMMARY OF THE INVENTION

In the present invention a safety feature is provided by apparatus connected for automatically raising the recording arm after a predetermined period of time. There is a spring which is connected for raising the arm, and the raising effect of this spring is overcome by a solenoid. The solenoid in turn is energized by any one of several operating controls through a timer. When the control is pushed, the timer is set and the arm-raising effect of the spring is overcome by the solenoid. After a period of time as determined by the timer, the solenoid is deenergized and the arm lifts automatically. This provides a fail safe safety feature which prevents inadvertent operation of the system with the recording/playback transducer riding on a recording track for an excessive period of time.

DESCRIPTION OF THE PREFERRED EMBODIMENTS

Figure 1:
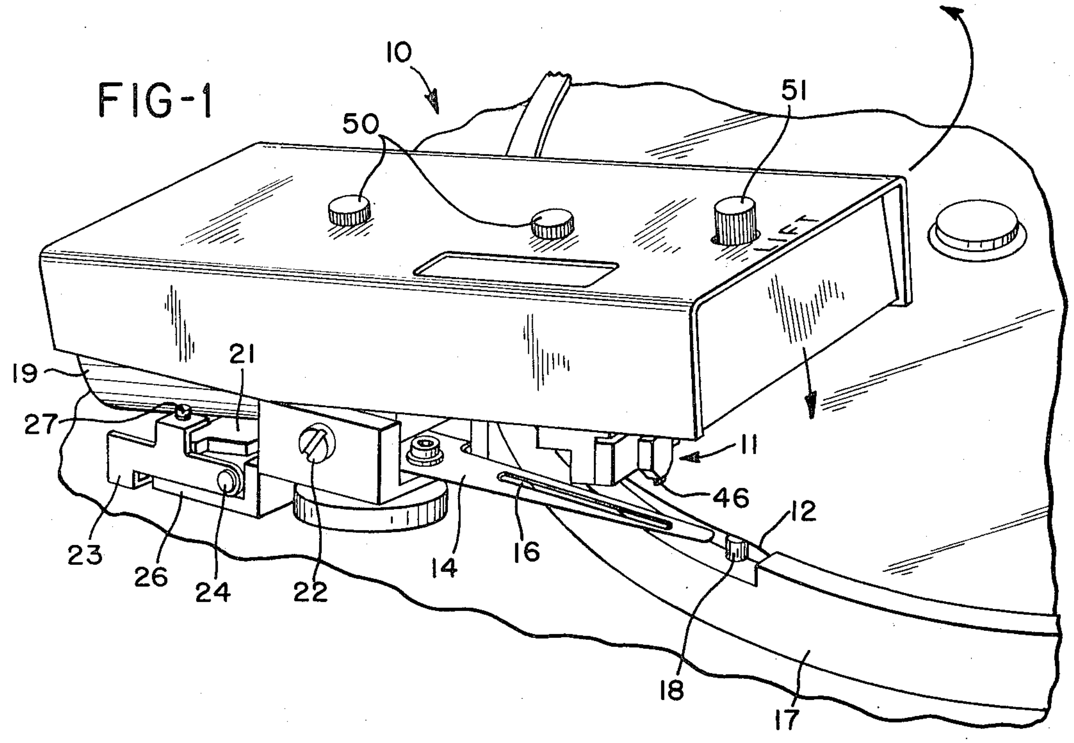
FIG. 1 is a perspective view of a disc recorder adapted for use with a safety lifter according to this invention.

A form of a recording system adapted for use in combination with apparatus according to this invention is shown in FIG. 1 wherein a recording arm 10 is shown in a disengaged position relative to a platter 17 with a flexible magnetic recording disc 12 and a stiff supporting disc 48 thereon. There may also be provided a stiff slotted cover disc (not shown) for protection of disc 12. A lift pin 18 provides a gap for insertion of a finger 14 between disc 12 and disc 48. Finger 14 has an aperture 16 therein for a purpose to be subsequently explained. Arm 10 pivots about a vertical axis for azimuth position of finger 14 and a recording head 11, and thereafter pivots about a horizontal axis 22 to bring the recording and playback transducer 46 into a recording position adjacent the disc 12.

Figures 3, 4, 5:
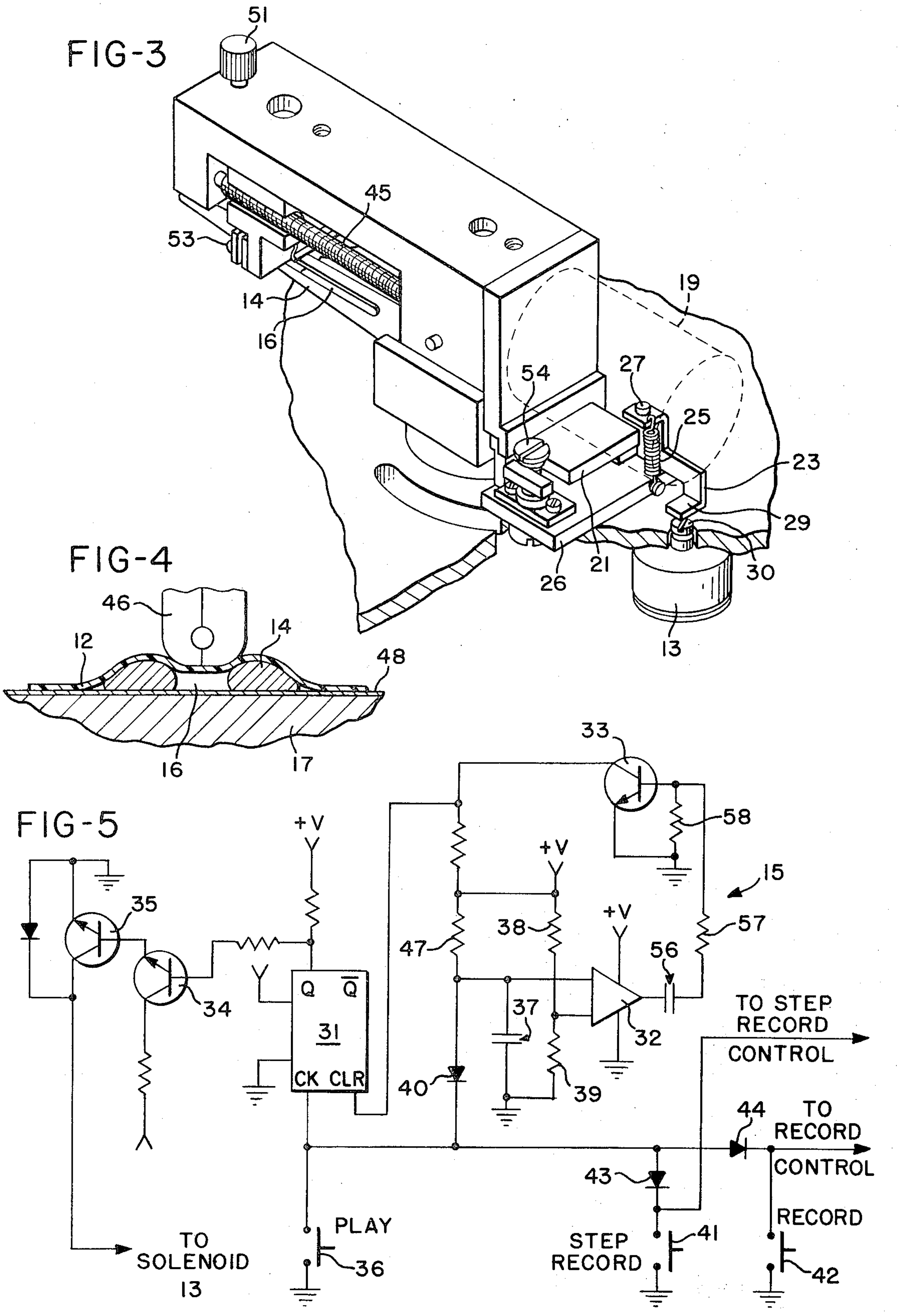
FIG. 3 is another perspective view of the arm of FIG. 3 with the cover removed.
FIG. 4 is a substantially enlarged cross sectional detail showing the interface relationship between the flexible recording disc, the guide finger, and the transducer face when the arm of FIG. 1 is in recording position.
FIG. 5 is an electrical schematic diagram of typical electronic components in one embodiment of a safety lifter according to this invention.

Referring now to FIG. 4; when the arm 10 is in its recording position, the transducer 46 is spaced a slight distance above platter 17 and centered over the aperture 16 in finger 14. The flexible disc 12 rides over the finger 14 and under transducer 46 as illustrated, and a support disc 48 rides under disc 12. Platter 17 is stationary and disc 12 rotates as described in more detail in Ser. No. 183,856.

Figure 2:
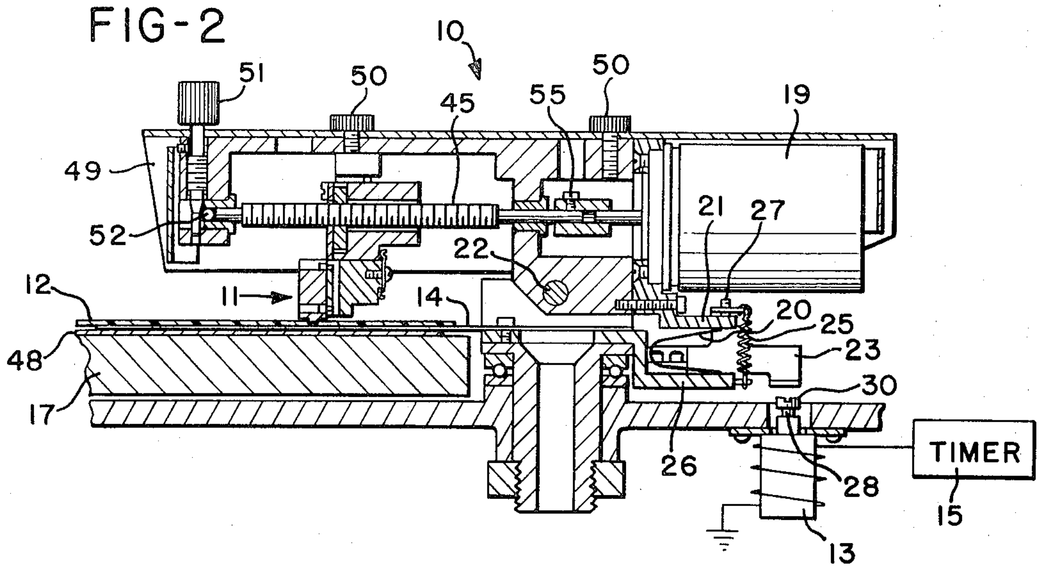
FIG. 2 is a side elevation in partial cross section of the recording arm of FIG. 1 in recording position.

Transducer 46 is carried by recording head 11 which in turn rides on a lead screw 45 (FIG. 2). Lead screw 45 is rotationally stepped by stepping motor 19 to produce intermittent radial movement of recording head 11. Video information to be recorded on disc 12 is recorded in a series of concentric circular tracks. Thus the recording system may have a set of controls (not shown) for playing, recording, or stepping head 11 to a predetermined track. There may also be controls for erasing, built in testing, or a step-record mode wherein the recorder steps from one track to an adjacent track and records in the new track.

The cover 49 for arm 10 is held in place by a pair of threaded fasteners 50, and there is a set screw 51 for adjusting the reach of lead screw 45. For this purpose set screw 51 has a conical surface which bears against a ball 52 at the end of lead screw 45. Thus downward movement of set screw 51 forces lead screw 45 backwardly and moves recording head 11 radially outward relative to recording disc 12. A set screw 55 may be temporarily loosened to enable this adjustment. Sufficient adjustment is provided to center transducer 46 anywhere within a given track on disc 12. Thereafter the stepping action of motor 19 and lead screw 45 moves transducer 46 to the same relative location within other tracks on disc 12. Another set screw 53 provides for azimuth adjustment of recording head 11, and a screw 54 provides for tilt angle adjustment of the entire arm.

In order to prevent transducer 46 from riding within any one track for an excessive period of time, there is a safety left mechanism under control of a timer. Thus a spring 25 is connected for lifting arm 10 upwardly, and a solenoid 13 is operative when energized to overcome the effect of spring 25 and lower arm 10 into the operating position. Solenoid 13 is energized by a timer 15 whenever any control is actuated to bring transducer 16 into the record position. After a predetermined period of time the solenoid is deenergized, and spring 25 raises arm 10 away from disc 12. Accordingly the system incorporates what may be termed a "fail safe" feature.

Under normal operating conditions with solenoid 13 energized, arm 10 is biased downwardly by a leaf spring 20 which bears against a plate 21 to pivot arm 10 about pivot point 22. The tilt angle adjusting screw 54 limits the upward movement of plate 21 thereby limiting the downward swing of arm 10. Upward movement of plate 21 is also limited by an adjustable screw 27 which is carried by a bracket 23. Bracket 23 serves as an attachment point for spring 25, the other attachment point being a fixed plate 26.

Bracket 23 pivots about a pivot point 24, and is urged downwardly by spring 25. When bracket 23 swings downwardly, screw 27 bears against the upper surface of plate 21 raising arm 10. Upward movement of the arm continues until the lower surface of bracket 23 strikes plate 26, stopping downward movement of the bracket. Downward movement of the bracket is also limited by a screw 30 set in a shaft 28 which is controlled by solenoid 13. When solenoid 13 is energized, screw 30 is thrust upwardly against an ear 29 on bracket 23. The bracket then pivots upwardly, extending spring 25 and moving screw 27 clear of plate 21. This enables lowering of arm 10 under the control of leaf spring 20 and set screw 54 as explained above. Recording or playback may then take place. Spring 25 remains extended until timer 15 deenergizes solenoid 13, at which time arm 10 is raised and transducer 46 is moved out of contact with disc 12.

A schematic diagram of the timer 15 is shown in FIG. 5. Circuitry for playing, recording, and step recording, none of which form a part of this invention may be connected to the timer as illustrated. The element within timer 15 which performs the timing function is a capacitor 37 which is normally charged by a positive potential source through a resistor 47. The positive potential source is connected to ground through resistor 47 and capacitor 37 and also through resistors 38 and 39 which form a voltage divider. The positive side of capacitor 37 is connected to one terminal of a differential amplifier 32, and the positive side of resistor 39 is connected to the other terminal thereof. The output from differential amplifier 32 is fed to the base of a transistor 33 which in turn is connected to the reset terminal of a flip-flop 31. In the normal condition with capacitor 37 charged, transistor 33 is gated OFF and flip-flop 31 is in the reset condition. When the PLAY switch 36 is pushed, capacitor 37 discharges through diode 40. This provides a negative edge trigger for flipping flip-flop 31 to the set state and also alters the output of differential amplifier 32. When flip-flop 31 assumes the set state, transistors 34 and 35 are gated ON to provide an actuation signal for solenoid 13. This results in lowering of recording head 11 as explained above. At the same time the changing output from differential amplifier 32 provides a current through capacitor 56 and resistors 57 and 58. This provides a bias voltage for transistor 33 and gates transistor 33 ON.

When capacitor 37 has become discharged, the output from differential amplifier 32 reaches a steady state condition and the bias current for transistor 33 terminates. This gates OFF transistor 33 thereby providing a negative edge trigger for flipping flip-flop 31 back to the reset state, deenergizing solenoid 13 and raising recording head 11. When PLAY switch 36 is released, capacitor 37 begins charging again for timing control of the next PLAY cycle.

As previously mentioned, recording apparatus employing this invention may use the safety lift feature in several different operating modes. Thus there may be employed a STEP RECORD switch 41 which operates the step record control and a RECORD switch 42 which operates the record control. Switch 41 provides capacitor 37 with a path to ground through diode 43, and switch 42 provides capacitor 37 with a path to ground through diode 44 so that either of switches 41 or 42 may also activate the safety timer. Capacitor 37 may be selected to provide the system with any desired safety delay. However, a safety delay of about 1 minute has been found to be satisfactory in one working embodiment.

While the form of apparatus herein described constitutes a preferred embodiment of the invention, it is to be understood that the invention is not limited to this precise form of apparatus, and that changes may be made therein without departing from the scope of the invention.

What is claimed is:

1. In a disc magnetic recorder having a rotatable magnetic record disc, an arm extending across said disc, a transducer mounted on said arm, and positioning means connected to move said transducer to follow different tracks around said disc, the improvement comprising means for lifting said transducer away from said disc, and a timer connected to actuate said lifting means whenever said transducer has been placed in actuating interface with said disc for a predetermined period of time.

2. In a magnetic recorder of the type in which a transducer is arranged to follow repetitively a track on a magnetic recording surface, including a transducer mounted for movement toward and away from a recording position, a magnetic recording member and means for moving said member repetitively past said recording position causing said transducer to follow a predetermined track thereon, the improvement comprising means for lifting said transducer away from said recording member to a known operative position displaced from said recording position, and a timer connected to tend to actuate said lifting means whenever said transducer is placed in said recording position at a predetermined time after such placement.

3. The improvement of claim 2 said lifting means comprising:

an arm for supporting said transducer, a spring for lifting said arm, and a solenoid connected to said timer and operative when energized to oppose the lifting action of said spring.

4. The improvement of claim 2 said lifting means comprising:

an arm for pivotally supporting said transducer relative to said recording surface, a bracket pivotally mounted relative to said arm, means mounted on said bracket for engaging said arm and lifting it into said operative position, a spring attached to said bracket for causing engagement of the bracket with said arm as aforesaid, and a solenoid connected to said timer and operative when energized to engage said bracket and cause disengagement of the bracket from said arm.

5. Apparatus according to claim 2 said timer comprising a normally charged capacitor and means for momentarily discharging said capacitor upon generation of a command for placing said transducer in said recording position.

* * * * *